(12) United States Patent
Disser

(10) Patent No.: US 8,425,142 B2
(45) Date of Patent: Apr. 23, 2013

(54) CONNECTING ARRANGEMENT AND ARTICULATED SHAFT COMPRISING SAME

(75) Inventor: Claus Disser, Seligenstadt (DE)

(73) Assignee: BF New Technologies GmbH, Muehlheim, DE (US)

( * ) Notice: Subject to any disclaimer, the term of this patent is extended or adjusted under 35 U.S.C. 154(b) by 271 days.

(21) Appl. No.: 12/670,323

(22) PCT Filed: Jul. 25, 2008

(86) PCT No.: PCT/DE2008/001207
§ 371 (c)(1),
(2), (4) Date: Nov. 18, 2010

(87) PCT Pub. No.: WO2009/012767
PCT Pub. Date: Jan. 29, 2009

(65) Prior Publication Data
US 2012/0270665 A1    Oct. 25, 2012

(30) Foreign Application Priority Data

Jul. 26, 2007  (DE) .......................... 10 2007 035 470

(51) Int. Cl.
*F16D 1/116* (2006.01)
(52) U.S. Cl.
USPC .......................... 403/359.5; 411/517; 464/906
(58) Field of Classification Search ................. 464/182, 464/906; 403/316, 319, 332, 359.5, 375; 411/517, 521, 522
See application file for complete search history.

(56) References Cited

U.S. PATENT DOCUMENTS

| 2,877,732 | A | * | 3/1959 | Eaton ......................... 403/332 X |
| 3,908,400 | A | * | 9/1975 | Takahashi et al. ............ 464/906 |
| 4,124,318 | A | * | 11/1978 | Sagady ................. 403/359.5 X |
| 4,325,232 | A | * | 4/1982 | Girguis ........................ 464/906 |
| 4,343,581 | A | | 8/1982 | Millheiser |
| 4,384,861 | A | | 5/1983 | Lange et al. |
| 4,813,810 | A | | 3/1989 | Suzuki |
| 5,499,884 | A | | 3/1996 | Kuehnhold et al. |
| 8,025,454 | B2 | * | 9/2011 | Cermak ....................... 403/319 |
| 2010/0143075 | A1 | * | 6/2010 | Disser ......................... 411/517 |
| 2012/0058832 | A1 | * | 3/2012 | Langer et al. |

FOREIGN PATENT DOCUMENTS

| DE | 102006034985 | 1/2008 |
| WO | 2007/055685 | 5/2007 |

OTHER PUBLICATIONS

International Preliminary Report on Patentability for Int. App. No. PCT/DE2008/001207, mailed Feb. 4, 2010.
International Search Report and Written Opinion for Int. App. No. PCT/DE2008/001207, Jan. 7, 2009.

* cited by examiner

*Primary Examiner* — Gregory Binda
(74) *Attorney, Agent, or Firm* — McDonnell Boehnen Hulbert & Berghoff LLP

(57) ABSTRACT

A connecting arrangement for a rotationally fixed connection of components in the drive train of a motor vehicle, comprising a shaft journal and a hub of an articulation, which has a central opening for receiving the shaft journal, wherein the shaft journal can be axially fixed in the hub, for example by a retaining ring. The invention further relates to an articulated shaft comprising such a connecting arrangement.

12 Claims, 4 Drawing Sheets

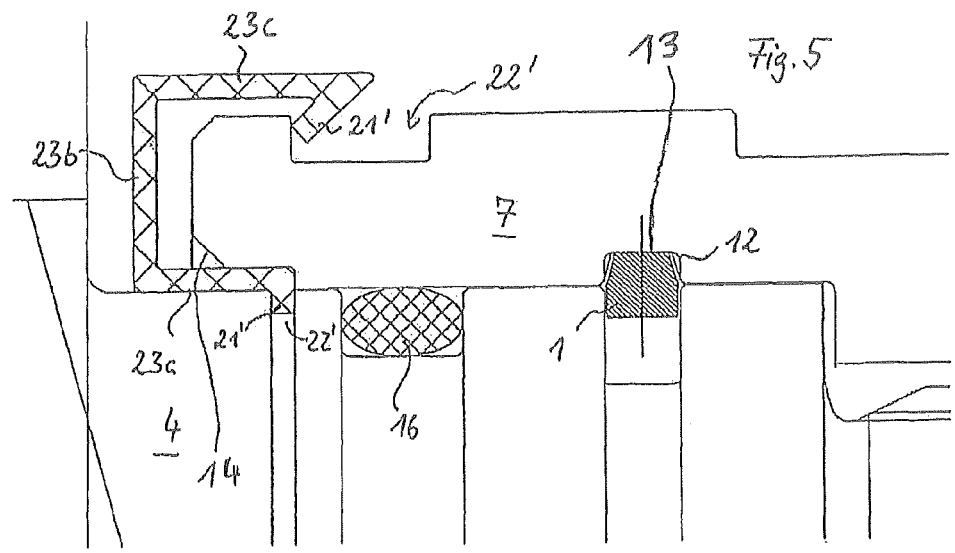
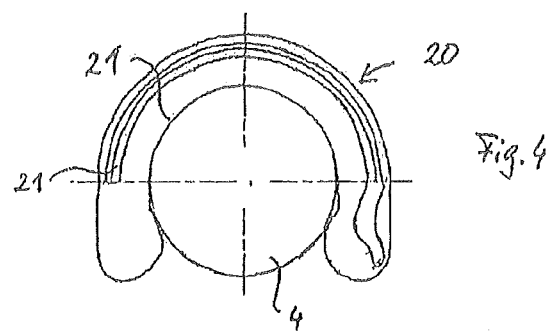
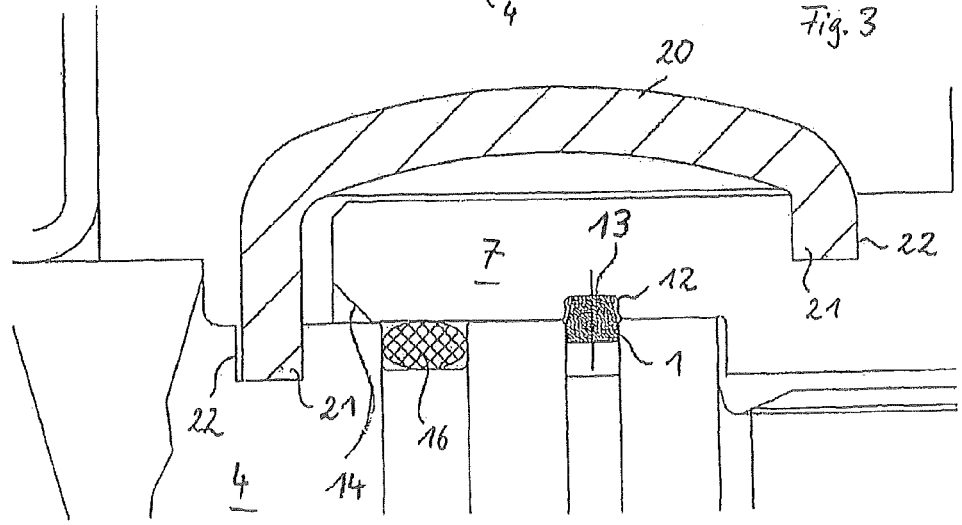

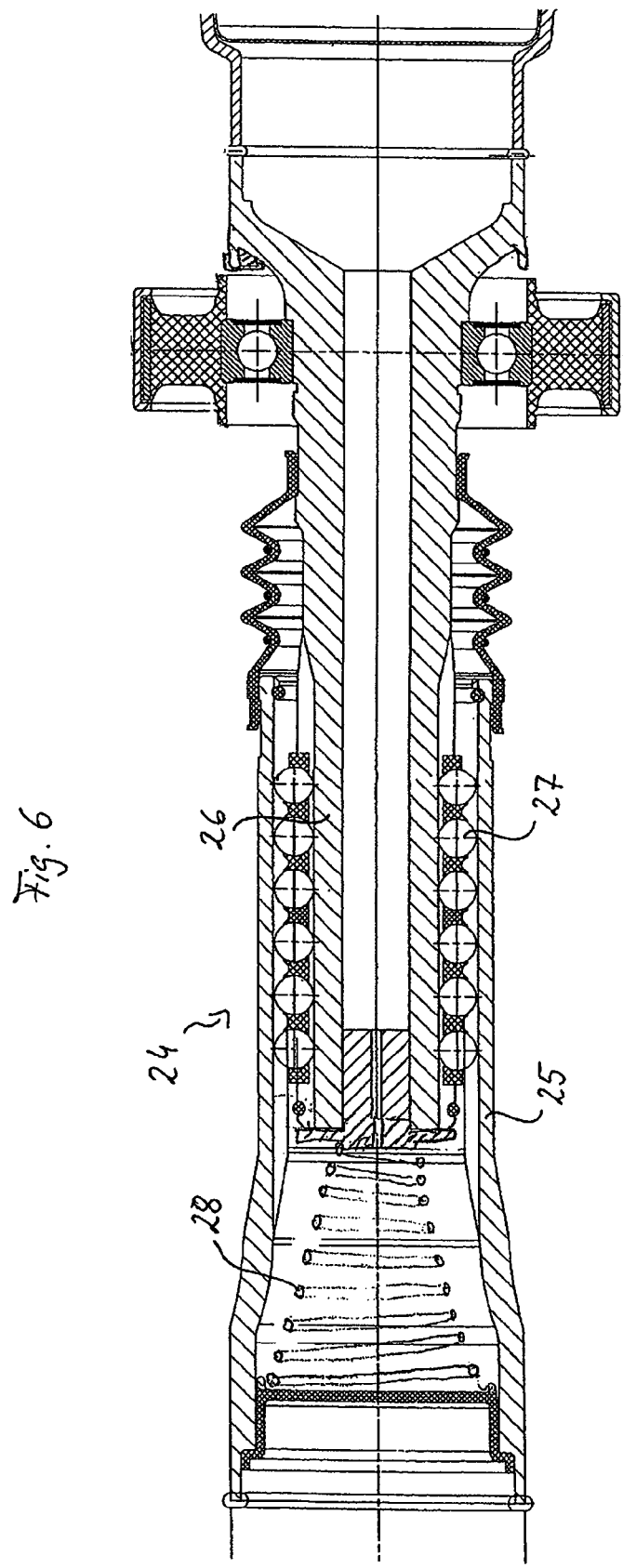

CONNECTING ARRANGEMENT AND ARTICULATED SHAFT COMPRISING SAME

CROSS-REFERENCE TO RELATED APPLICATIONS

The present application is a U.S. National Phase Application pursuant to 35 U.S.C. §371 of International Application No. PCT/DE2008/001207 filed Jul. 25, 2008, which claims priority to German Patent Application No. 10 2007 035 470.5 filed on Jul. 26, 2007. The entire disclosure contents of these applications are herewith incorporated by reference into the present application.

FIELD OF INVENTION

The invention concerns a connecting arrangement for the rotationally fixed connection of components in the drive train of a vehicle with a first component that is provided, at least in sections, with an essentially cylindrical outer surface with first torque transmission means, and a second component that is provided, at least in sections, with an essentially cylindrical inner surface with second torque transmission means for receiving the cylindrical outer surface of the first component, whereby the first and/or the second component is a component of an articulated joint that can be moved in axial direction and/or permits bending, and with a connection means that can be snapped in for axial fixation of the two components at each other. Further, the invention concerns an articulated shaft with such a connecting arrangement.

BACKGROUND

Articulated shafts of this type that are used in connecting arrangements of motor vehicles are frequently designed so that the first component is a shaft or a shaft journal in the power train of a vehicle, while the second component is designed as a hub of an articulation that is provided with a central opening. In the installation of the articulated shaft, the connecting device is locked, in order to either connect components of the articulated shaft with each other or to fixate the articulated shaft, for example, at a shaft journal on the transmission side or on the differential side. As the transmission of power of the drive train of the vehicle takes place, among other things, via this connecting arrangement, it is necessary to ensure that the connecting device of the connecting arrangement does not release itself from its locked position.

Beyond that, it is desirable during installation when an optical determination can be made from the outside whether the connection device is properly snapped in.

Otherwise, the connecting arrangement could release itself during operation so that the torque transmission between the components would be interrupted.

It is therefore the problem of the present invention to provide a connecting arrangement, as well as an articulated shaft of the type mentioned at the beginning, in which a secure axial fixation of the two components to each other is made possible.

SUMMARY

This problem is solved in accordance with the invention essentially thereby, that the connecting arrangement, in addition to the lockable connection device, is provided with a safety device for retaining the connecting device in its locked position. This additional safety device thereby prevents on the one hand, that the lockable connecting device can unintentionally release itself from its snapped in position during operation, and simultaneously permits a control as to whether the lockable connecting device has reached its proper snapped in position. In accordance with the invention, this can be achieved thereby, that the additional safety device can be activated only when the connection device is in its snapped in position. The activation of the additional safety device thus indicates during installation already, that the—most often not visible from the outside—lockable connecting device for axial fixation of the two components, is reliably snapped in.

According to a preferred embodiment of the invention, the connecting device is provided with a safety ring, which can be inserted into slots dedicated to each other in the outer surface and the inner surface to connect the two components. Such a safety ring makes the production of a reliable, lockable connecting device possible in a particularly easy way.

A particularly reliable connection of the two components, as well as in order to make a defined failure-free ability to disassemble possible, in the further development of the inventive idea, the connecting device is provided with a safety ring made of elastic material, particularly spring steel with a, for example, radially extending groove, whereby the safety ring has a profile with an essentially rectangular cross section and at least one edge of the profile is provided with a defined chamfer for assembly and/or disassembly of the safety ring. A chamfer of this type at an edge of the profile of the safety ring can thereby come in contact with an edge or the like of a slot in an axial motion of the components that are connected with each other by the safety ring, so that the safety ring can be pressed radially toward the inside or the outside. Thus, the danger that the safety ring dislocates uncontrolled in a position in which the connection can no longer be released non-destructively, is minimized.

Thereby, it is preferred when the at least one defined chamfer is provided at one of the two radial outer edges of the safety ring. Hereby, at least a defined assembly or disassembly of the safety ring is possible. However, it is especially preferred when defined chamfers are provided at both radial outer edges of the safety ring, so that the assembly as well as the disassembly of the safety ring is made possible by means of defined forces. Thereby, the defined chamfer can extend sloped at an angle of, for example, 15° to 35° with respect to the radial lateral surface of the safety ring.

The additional safety device in accordance with the invention can, according to an embodiment of the invention, have an additional safety slot on the outer surface of the first component, a second safety slot provided on the outer surface of the second component, as well as a clamp and/or sleeve, that is provided with two safety protrusions that can be inserted into the first or second safety slot. The two safety protrusions and the two safety slots are thereby formed and located in such a way that the safety protrusions can engage with the safety slots only then, when the connecting device is in its snapped in position. The activation of the additional safety device by engaging the safety protrusions in the safety slots is consequently an optically controllable indication that the connecting device is properly snapped in.

Alternative to the provision of two safety slots at components that are to be connected with each other and two safety protrusions at the safety device, it is conversely also possible to provide safety protrusions at the two components and safety slots at a clamp and/or sleeve of the safety device.

According to a preferred embodiment of the invention, the clamp and/or sleeve is essentially U-shaped and designed so that it can be mounted on each of the two components. This way, the clamp and/or sleeve can, for example, be designed as a ring that can be mounted on the first component that is provided with a connecting section bearing on the first component, for example, a cylindrical section first section, an attached connecting section radially extending away from the first component and a second section overlapping the second component that is parallel to the first section. The safety protrusions can thereby be respectively provided at the end opposite to the connecting section of the first or second section. In other words, the second component can be inserted into a ring space of the clamp or sleeve between the two sections, whereby the second safety protrusion at the second section can snap into a corresponding slot on the outside of the second component. This allows an additional optic control for determining whether the safety device and thus the snappable connecting device is properly fixated.

Alternatively, it is also possible to design the clamp and/or sleeve of the safety device in such a way that it is not mountable in axial direction, but can be mounted on both components in radial direction. The safety protrusions can then be fixated in safety slots that are located next to each other in the first or second component.

A particularly preferred embodiment of the invention provides that the clamp and/or sleeve is designed as a locking sleeve that can be snapped unlockably into a first locking position with one of the safety protrusions into one of the two safety slots, and in a second locking position—respectively with both safety protrusions—can be snapped respectively into one of the two safety slots. The first locking position thereby makes the fixing of the safety device at one of the two components possible for the assembly, whereby the actual locking only takes place in the second snapping position.

In a further development of this inventive idea it is preferred, when in the first snapping position prior to the snapping in of the connecting device, an axial relative motion can take place between the first and the second component.

The additional safety device can, according to an additional embodiment of the invention, be provided with an elastic element, which is dedicated to one of the two components in such a way that the elastic element pushes this component into the locked position of the connecting device. The elastic element can thereby, for example, be designed as a compression spring or a disk spring packet. It is possible hereby, that the additional safety device always exerts a force onto the two components that are to be connected with each other during operation in such a way that these are retained in their snapped in position of the connecting device. This can also make the assembly of the connecting arrangement easier.

The problem of the present invention is further solved by an articulated shaft for a drive train of a vehicle with at least one connecting arrangement of the type mentioned above, whereby the first component is a shaft or a shaft journal and the second component is a hub of an articulated shaft that is provided with a central opening, particularly an interior hub.

In a further development of this inventive idea it is provided that the articulated shaft is provided with two articulated shafts that are connected rotationally fixed with each other by a constant velocity fixed articulated shaft that is designed as middle shaft, whereby respectively a constant velocity fixed articulated shaft is located at the respective end facing away from the middle shaft of each articulated section. Further, the articulated shaft is provided with at least one roller displacement unit preferably close to the middle shaft, that is provided with a profile sleeve on the inner surfaces of which, at least in sections, outer tracks are provided, a journal that is displaceable in a profile sleeve in axial direction on the outer surface of which at least in sections, interior tracks are provided, and has balls that are located respectively pair-wise in outer tracks and inner tracks that are dedicated to each other.

When the articulated shaft is provided with a roller displacement unit it is preferred when between the journal of the roller displacement unit and the profile sleeve, a compression spring is provided as additional safety device for retaining the connection device of the connecting arrangement in its locked position. For this reason, the additional safety device that is designed as compression spring does not need to be provided directly on one of the two components of the connecting arrangement.

In the following, the invention is explained in more detail in conjunction with examples of embodiments and by referring to the drawing. Thereby, all described and/or pictorially illustrated characteristics by themselves or in any combination are the subject matter of the invention, independent of their summary in the claims or their reference.

BRIEF DESCRIPTION OF THE FIGURES

Schematically shown are.

DETAILED DESCRIPTION

Figure 2:
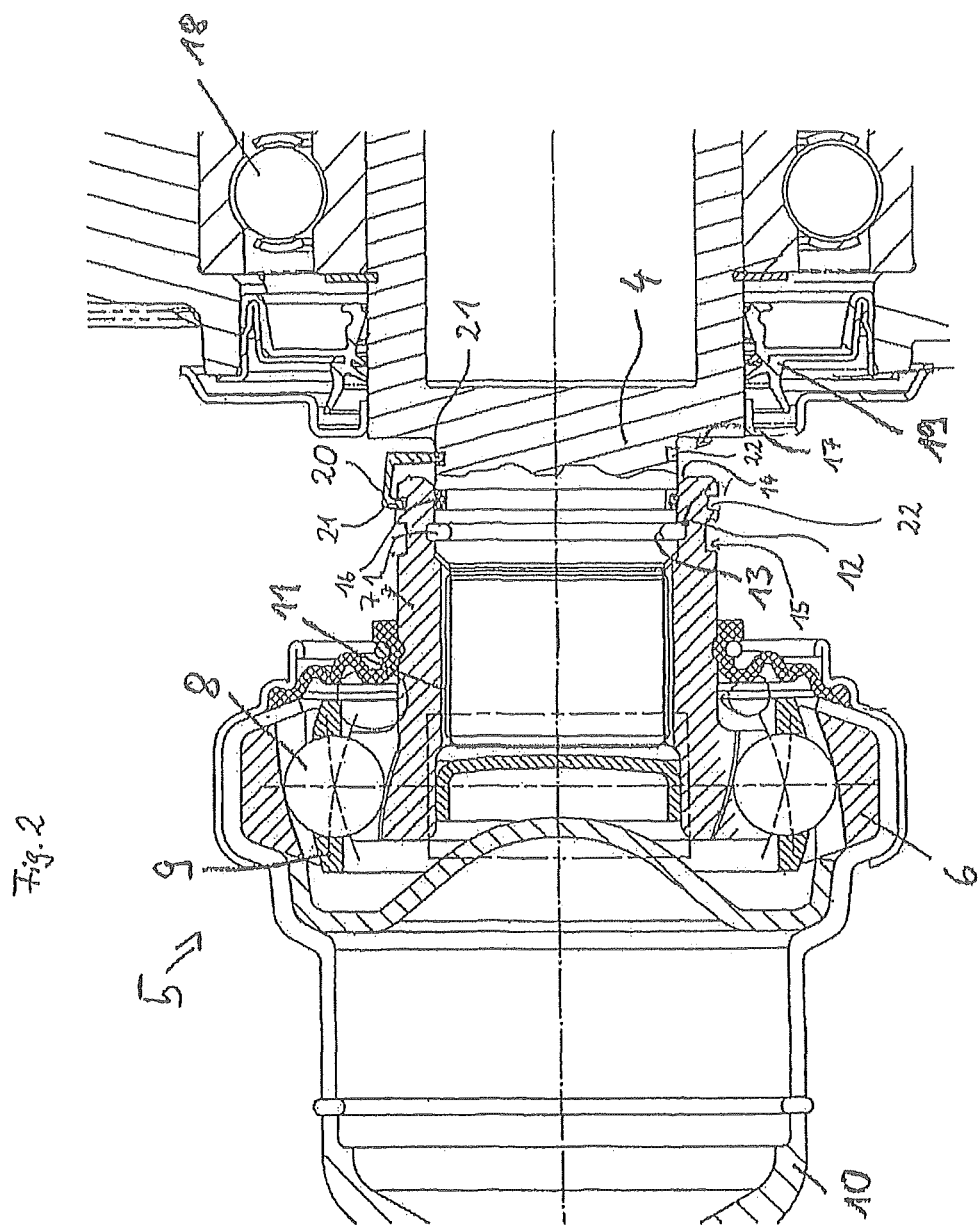

In FIG. 2, a connecting arrangement in accordance with the invention is shown, in which a shaft journal 4 on the transmission side is connected to a ball joint 5 by a safety ring 1. The ball joint thereby has an outer hub 6 with several chamfers designed as counter tracks, as well as an inner hub 7, that is also provided with chamfers designed as counter tracks.

In the pairs of chamfers that are dedicated to each other pair-wise in the outer hub 6 and the inner hub 7, balls 8 are received respectively, that are guided in a cage 9. As a result, a moment of rotation can be transmitted from the inner hub 7 to the outer hub 6, as well as to a hollow shaft 10 that is connected with such.

For the transmission of torque between the inner hub 7 and the shaft journal 4, the inner hub 7 on the inside and the shaft journal 4 on the outside, can be provided with an integral key gearing 11. The shaft journal 4 can thus be inserted rotationally fixed into inner hub 7 and only needs to be fixated axially by safety ring 1.

In the inner hub 7, as well as in the shaft journal 4, slots 12 or 13 are provided that are dedicated to each other. A safety ring 1 can be inserted in slot 13 on shaft journal 4, which projects out of slot 13 at least in sections in unloaded condition. For the axial connection of the shaft journal 4 to the inner hub 7, the shaft journal 4 is inserted into inner hub 7, whereby the safety ring 1—because of the insertion chamfer 14 at the facing side of inner hub 7, is pressed into slot 13. As soon as slots 12 and 13 are positioned in the position dedicated to each other, as shown in FIG. 2, the safety ring 1 also snaps into slot 12 of inner hub 7 by radially broadening as a consequence of its preloading. Hereby, the connection between the inner hub 7 and the shaft journal 4 is established.

Figure 1:
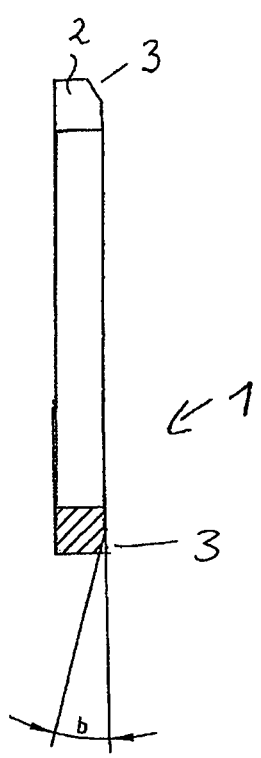
FIG. 1 a safety ring for a connecting arrangement according to a first embodiment of the invention,
FIG. 2 a connecting arrangement according to a first embodiment of the invention,
FIG. 3 enlarged, a detail of the connecting arrangement according to FIG. 2,
FIG. 4 a lateral view of the safety device of the connecting arrangement according to FIG. 2,
FIG. 5 a connecting arrangement according to a second embodiment of the invention, and
FIG. 6 a safety device according to a third embodiment of the invention.

As seen in the axial direction, the safety ring 1 shown in FIGS. 1 to 3 and 5, is provided with an essentially round form with a groove 2, which permits a radial flaring or compressing of the safety ring 1. As can be seen in FIG. 1, the safety ring 1 has an essentially rectangular profile in cross section. In the embodiment as per FIG. 1, at one of the radial outer edges of the safety ring 1, a chamfer 3 is provided, which is inclined at an angle larger than 10°, for example, approximately 15° with respect to the radially extending lateral surface of the safety ring 1. For the connection of two components and for releasing this connection, the safety ring 1 must be sufficiently elastic and for this purpose, it can, for example, consist of spring steel.

Alternatively, in further embodiments of a safety ring, both radial outer edges of the safety ring can be provided with defined chamfers or a radial outer edge and a radial inner edge of the safety ring is provided with a chamfer. The safety ring 1 has the form of a level disk or it can be provided with a corrugated profile so that the safety ring can also balance an axial play.

On the outer side of the inner hub 7, an assembly slot 15 can be provided that permits the engagement of a tool for pushing together the inner hub 7 and the shaft journal 4. Further, on shaft journal 4, an additional slot can be provided for receiving gasket ring 16.

For releasing the connection between the shaft journal 4 and the inner hub 7, a tool can be inserted into the disassembly groove 17 between the facing side of the inner hub and a shoulder of the shaft journal 4, as a result of which the inner hub 7 can be removed from shaft journal 4. In this process, an edge of slot 12 of inner hub 7 comes to abut with the chamfer 3 of safety ring 1. The edge of slot 12 thereby slides over the chamfer 3 of safety ring 1 and thereby pushes it radially towards the inside into slot 13, so that the inner hub 7 can be pulled off the shaft.

The assembly and/or disassembly of the connection between the shaft journal 4 and the inner hub 7 can also take place by means of a plane hole-shaped tool, which can be used in the assembly slot 15 or in disassembly groove 17.

This tool, which is not shown in the figure, can be provided with a rod that is mounted displaceable on a weight. Further, at the rod, at least one deflector surface is provided, against which the weight can be thrust, so that an impulse is transmitted from the rod to the plane hole-shaped tool, which consequently pushes the inner hub 7 onto shaft journal 4 or pulls it off from such.

The connecting arrangement shown in FIG. 2 is not only lighter and more compact than conventional connecting arrangements with a shaft nut, but it also makes it possible to keep the journal shaft 4 small. As a result, bearing 18 and shaft gasket rings 19 can be used advantageously with a comparably small diameter.

The connecting arrangement in accordance with the invention is additionally provided with a safety device 20, that is formed essentially by a locking sleeve shown in detail in FIGS. 3 and 4, which fixates the shaft journal 4 and the ball articulated shaft 5 axially to each other when the safety ring 1 is snapped into slot 12. For this, locking sleeve 20 is provided with bar-like safety protrusions 21 that are designed in corresponding safety slots 22 on shaft journal 4 and inner hub 7.

As can be seen in the lateral view of FIG. 4, the locking sleeve 20 of the additional safety device has an essentially U-shaped form. As a result of this it is possible to mount locking sleeve 20 onto the connecting arrangement in radial direction. By means of the snap lugs in the section of the safety protrusions 21, the locking sleeve 20 can be locked on shaft journal 4 or on the inner hub 7. The safety protrusions 21 are thereby so far distant from each other in axial direction that they can engage with the safety slots 22 only when the safety ring 1 is snapped into slot 12. The activation of the additional safety device 20 by the engagement of the safety protrusions 21 with the safety slots 22 is thus an optically controllable indication that safety ring 1 is properly locked. The safety protrusions 21 can also be designed in such a way that the locking sleeves 20 can be displaced in radial direction between the two locking positions. Thus in the first locking position, only one of the two snap protrusions 21 is engaged with a corresponding safety slot 22, while the second safety protrusion 21 is not yet engaged with the corresponding safety slot 22. To the extent the safety ring 1 is not yet engaged with slot 12, a relative axial displacement of inner hub 7 toward shaft journal 4 is consequently still possible. Locking sleeve 20 can then be displaced into the second locking position in which both safety protrusions 21 engage with the respective safety slots 22 only after the engagement of safety ring 1.

A further embodiment of an additional safety device is illustrated in FIG. 5. The additional safety device is designed as an annular clamp or sleeve 23 in this embodiment that is provided with a first, essentially cylindrical section 23a, a radial connection section 23b that projects away, and a second cylindrical section 23c that is in turn connected with such. The two sections 23a and 23c thereby extend coaxially toward each other and to journal shaft 4, upon which the first section 23 bears. At the end of the first section 23a that is facing away from connection section 23b, a safety protrusion 21' is provided, with which a corresponding safety slot 22' of journal shaft 4 engages. Thereby, the annular sleeve 23 is firmly retained in an axial direction on the journal shaft 4. Between the first section 23a and the second section 23c, an annular space is formed into which one end of the inner hub 7 projects, so that sleeve 23 can attach to journal shaft 4.

On the outer surface of inner hub 7, an additional safety slot 22' is formed, with which a hook-like safety protrusion 21' of the second section 23c can engage. The two safety protrusions 21' and safety slots 22' are thereby in turn arranged respectively in such a way, that the two safety protrusions 21' can engage with the respective safety slots 22' only when safety ring 1, as shown in FIG. 5, is locked into slot 12 of inner hub 7.

A further embodiment of an additional safety device is shown in FIG. 6, which shows a detail of an articulated shaft in which a roller displacement unit 24 is provided. The roller displacement unit 24 thereby essentially has a profile sleeve 25, a journal 26 that is received displaceable by such and balls 27 that are formed in pair-wise inner tracks and outer tracks dedicated to each other on the inner surface of the profile sleeve 25 or the outer surface of journal 26. The balls 27 that are guided in a sleeve-shaped cage can roll off in the pairs of tracks so that the profile sleeve 25 can be displaced relative to the journal 26 in axial direction.

Between the profile sleeve 25 and the journal 26, a compression spring 28 is located, which loads the journal 26 in the figure toward the right, i.e. it loads it into the position that is moved out of profile sleeve 25. When the roller displacement unit 24 that is shown in FIG. 6 is provided with a compression spring that is integrated in an articulated shaft, which is provided with a connecting arrangement as per FIG. 2, 3 or 5, the compression spring 28 thus causes that the shaft journal 4 and the inner hub 7 are pushed into each other. A release of safety ring 1 out of slot 12 in inner hub 7 can be prevented by this axial preloading. The roller displacement unit 24 with the compression spring 28 thus acts as an additional safety device that retains the connection device formed by the safety ring 1 in its locked position.

The invention claimed is:

1. Connecting arrangement for the rotationally fixed connection of components in the drive train of a vehicle with
a first component, particularly designed as a shaft or a shaft journal in the drive train of a vehicle that is, at least in sections, provided with an essentially cylindrical outer surface with first torque transmission means, and
a second component particularly designed as an inner hub of an articulated shaft provided with a central opening that has, at least in parts, an essentially cylindrical inner surface with second torque transmission means for receiving the cylindrical outer surface of the first component,
whereby the first and/or the second component is a component of an articulated joint that can be moved in an axial direction and/or an articulated shaft that permits bending, and
with a lockable connection device for axially fixating the two components to each other, characterized by,
that an additional safety device is provided for retaining the connection device in its locked position,
the connection device is provided with a safety ring that can be inserted to connect the two components in slots in the outer surface and the inner surface that are dedicated to each other,
wherein the safety ring is made of an elastic material with, for example, a radially extending groove,
whereby the safety ring has a profile that is essentially rectangular in cross section and at least one edge of the profile is provided with a defined chamfer for assembly and/or disassembly of the safety ring.

2. Connecting arrangement according to claim 1, characterized by,
that the additional safety device has an additional first safety slot provided on the outer surface of the first component,
a second safety slot on the outer surface of the second component,
as well as a clamp and/or sleeve that is provided with two safety protrusions that are insertable in the first or second safety slot.

3. Connecting arrangement according to claim 2, characterized by,
that the clamp and/or sleeve is essentially U-shaped and is designed so that it can be mounted on the two components.

4. Connecting arrangement according to claim 3, characterized by,
that the clamp and/or sleeve is designed as a locking sleeve that can be detachably locked in a first locking position with one of the safety protrusions in one of the two safety slots, and
in a second, particularly a locking position mounted further onto the two components, is lockable with both safety protrusions respectively in one of the two safety slots.

5. Connecting arrangement according to claim 4, characterized by,
that in the first locking position prior to the locking of the connection device, an axial relative motion can take place between the first and the second component.

6. Connecting arrangement according to claim 2, characterized by,
that the clamp and/or sleeve is designed as a locking sleeve that can be detachably locked in a first locking position with one of the safety protrusions in one of the two safety slots, and
in a second, particularly a locking position mounted further onto the two components, is lockable with both safety protrusions respectively in one of the two safety slots.

7. Connecting arrangement according to claim 6, characterized by,
that in the first locking position prior to the locking of the connection device, an axial relative motion can take place between the first and the second component.

8. Connecting arrangement according to claim 1, characterized by,
that the additional safety device is provided with an elastic element, which is dedicated to one of the two components in such a way that the elastic element pushes this component into the locked position of the connection device.

9. Connecting arrangement according to claim 8, characterized by, that the elastic element is a compression spring.

10. Articulated shaft for a drive train of a vehicle with at least one connecting arrangement according to claim 1,
whereby the first component is a shaft or a shaft journal and the second component is a hub of a shaft that is provided with a central opening.

11. Articulated shaft according to claim 10 with two shaft sections that are connected with each other rotationally fixed by a middle shaft that is designed as a constant velocity fixed joint,
whereby at the end of each shaft section that is facing away from the middle shaft a constant velocity fixed joint is located and with at least one, particularly located near the middle shaft-roller displacement unit that has a profile sleeve on the inner surface on which outer tracks are provided at least in sections,
a journal that is displaceable in the axial direction in the profile sleeve, on the outer surface of which inner tracks are provided at least in sections and
which is provided with balls that are located for torque transmission in respectively pair-wise outer tracks and inner tracks that are dedicated to each other.

12. Articulated shaft according to claim 11, characterized by,
that between the journal of the roller displacement unit and the profile sleeve a compression spring arrangement is provided as an additional safety device for retaining the connection device of the connecting arrangement in its locked position.

* * * * *